Aug. 26, 1952     J. P. PEARSE     2,608,279
MEANS FOR FLEXIBLY MOUNTING PANELS
Filed Sept. 9, 1947
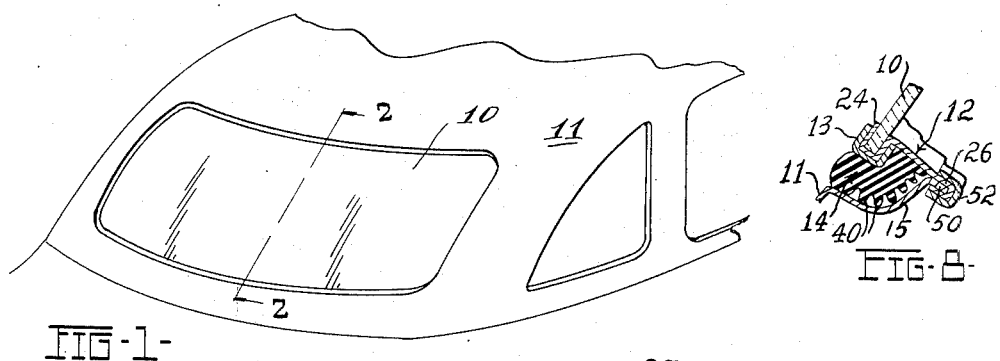
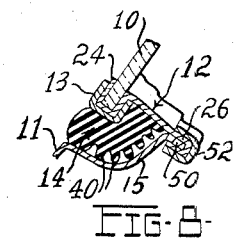
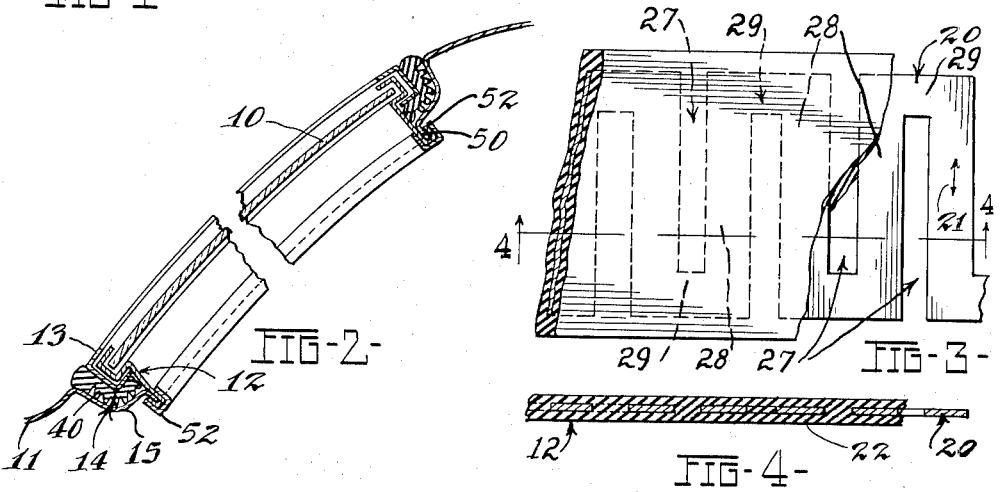
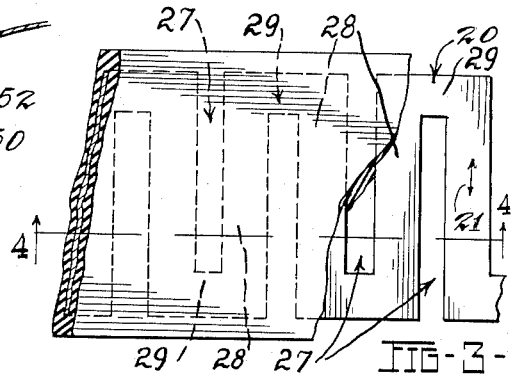
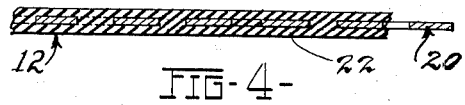
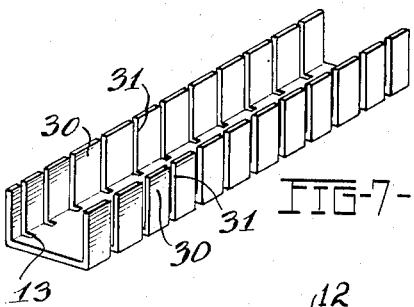
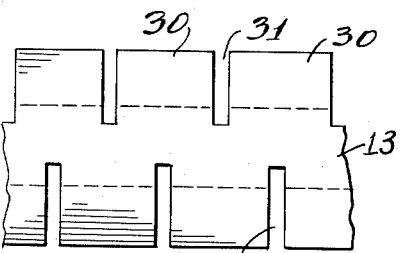
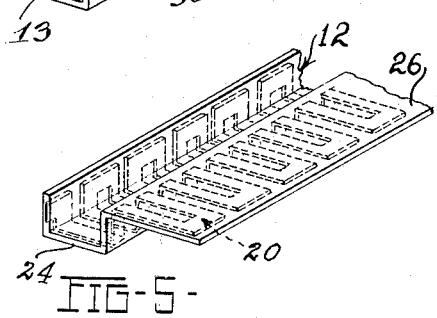
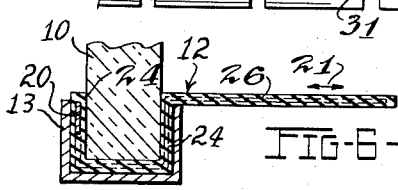
INVENTOR.
JOHN P. PEARSE
BY
ATTYS.

Patented Aug. 26, 1952

2,608,279

UNITED STATES PATENT OFFICE 2,608,279

MEANS FOR FLEXIBLY MOUNTING PANELS

John P. Pearse, Swanton, Ohio, assignor to Libbey-Owens-Ford Glass Company, Toledo, Ohio Application September 9, 1947, Serial No. 773,026

10 Claims. (Cl. 189—77)

This invention relates to mounting glass or similar panels and is particularly directed to a flexible mounting means for bent glass windows of the type used in automobiles and aircraft.

It has been proposed to utilize panes of glass bent in two directions, both vertically and horizontally, for the windshield and rear window openings of automobiles but the adoption of this glass has been delayed for lack of suitable mounting members. The tolerance allowed for variations in the dimensions of the glass added to the tolerance permitted with respect to the body openings in which the glass must be set, have been such that previously known mounting means are incapable of holding the glass in place without setting up strains to such an extent that the glass is liable to break. If the glass is to be held strain-free the mounting member must be capable of being set with a wide dimensional variation and must still be capable of providing a seal against driving rain and air.

The primary object of the present invention is to provide a low cost mounting for bent glass windows which results in a strain-free setting of the glass and a substantially perfect seal.

Another object of the invention is to provide a mounting which can be produced inexpensively and efficiently at low cost and which lends itself to rapid assembly.

Still another object of the invention is to provide a mounting for bent glass windows which is capable of easy replacement in the event that the glass becomes broken.

Other objects and advantages of the invention will become apparent from the following detailed description of a preferred embodiment thereof, reference being had to the accompanying drawings in which:

Fig. 1 is a fragmentary perspective view of the rear quarter of an automobile having a bent glass light in the rear window; Fig. 2 is a section on line 2—2 of Fig. 1; Fig. 3 is a fragmentary view, with parts broken away, of one of the elements of the mounting means; Fig. 4 is a section on line 4—4 of Fig. 3; Fig. 5 is a perspective view, on a smaller scale, of a formed mounting element of the form shown in Figs. 3 and 4; Fig. 6 is an end view of the strip shown in Fig. 5; Fig. 7 is a perspective view of a portion of a channel member which forms one of the mounting elements; Fig. 8 is an enlarged sectional view of the completed assembly positioned in the window opening of a vehicle; and Fig. 9 is a fragmentary view of a blank from which the channel member, shown in Fig. 7 may be formed.

Referring to the drawings, the mounting means, according to the present invention is shown in its preferred form and in conjunction with a rear window light 10 of an automotive vehicle 11 and forms a peripheral seal for the window light in the body of the automobile. It will be appreciated that the invention is applicable wherever it is necessary to set a pane of glass, whether curved or flat, in an opening, but that it is particularly useful where large quantities of irregularly shaped panes are used. The sectional views, Figs. 2 and 8, show the light 10 in place in the body and all of the elements of the mounting means are there shown in section. The light 10 is first engaged by a primary strip 12 around which is disposed a channel 13 and a resilient sealing mass 14 which seats against a formed surface 15 in the vehicle body 11. Each of the elements will be described in detail and are shown in Figs. 2 and 8 in a somewhat expanded relation since in practice the parts lie closely adjacent each other in tight sealing relation.

The initial glass contacting and sealing strip 12 is shown in Figs. 3, 4, 5, and 6 and comprises a thin metal web 20 which may be slotted to provide flexibility in two directions; that is, the metal is made sufficiently thin or weakened to be bent readily to conform to the periphery of the glass but is dimensionally stable in the direction of the arrow 21. The web 20 is provided with spaced transverse slots 27, with the adjacent slots extending inwardly from the opposite sides thereof to produce a body structure of substantially serpentine formation. More specifically, the slots 27 are separated from one another by transversely disposed, bar-like strips 28, each strip being connected at its opposite ends to the adjacent strips by transverse webs 29. Thus, adjacent slots open to opposite sides of the web and are closed at their other ends by the webs 29. The particular formation of the web herein provided permits flexibility thereof in two directions so that when the web is shaped to provide the primary sealing strip 12, it can be bent to assume the outline of a flat sheet of glass having rounded corners, or a glass sheet which is curved in one or both of its axes. The metal web 20 is covered on each side or embedded in a rubber-like mass 22, somewhat exaggerated in thickness in Fig. 4. It is preferred to make the web 20 of metal in the order of .005 to .010 inch in thickness and the resilient sealing covering or embedding mass 22 is approximately of the same thickness. As shown in Fig. 5 the initial strip may be bent to form a U-shaped glass engaging and sealing channel 24 having a fastening extension 26 projecting from one side. The dimensions of the channel 24 are determined almost entirely by the glass itself and will conform very closely to the periphery of the glass. The rubber covering or embedding mass 22 engages the glass so closely that entry of water or air around the edge of the glass is prevented. While the primary sealing strip is shown as a continuous member of uniform width, continuity is essential only in the region of the glass where the strip is used to form a seal.

The channel 24 of the sealing strip is held in place by a secondary spring channel member 13 constructed as shown in Figs. 7 and 9. As there shown the channel member 13 comprises a series of upstanding spring fingers 30 at each side of the channel with slots 31 in staggered relation to each other laterally of the channel. The base of the channel 13 coincides with the thickness of the glass plus twice the thickness of the initial channel 24 and the spring fingers 30 may be initially slightly bent inward so that the channel may be forced in place and frictionally engages the outer surface of channel 24 forcing this latter member into close sealing engagement with the periphery of the glass. The channel 13 is, of course, flexible in the plane of fingers 30 so that it may be bent easily around the initial mounting channel and will, as above noted, force this member closely against the glass. The sealing position of strip 13 may be made such that subsequent temperature resultant variations in the strip are not enough to cause it to move away from sealing position.

The interior seal of the mounting means being thus formed by cooperation between the initial channel 24 and its holding channel 13, the outer, body seal is formed by a resilient mass or gasket 14 which is sufficiently flexible to conform to any irregularities in the body opening and may be drawn tightly thereagainst to seal the surface between itself and the body opening. The gasket 14 preferably comprises a body of rubber molded to conform to the bottom and interior surface of the channel 13 but having a series of flexible fingers 40 where it is in engagement with the curved portion of the body opening 15. By providing flexible sealing fingers at this point the force required to establish a sealing connection is reduced since it is only necessary to deform the fingers and not an entire solid mass of rubber. The fingers 40 are made long enough to accept the range of tolerance set up for the body opening.

The fastening extension 26 of the initial sealing channel 24 whether continuous or in the form of spaced tongues, may be fixed to the interior of the automobile body in any suitable manner. One suitable fastening is indicated in Figs. 2 and 3 and comprises an extension 50 as a part of the body opening 15. The fastening extension 26 is deformed around this extension and held in place by a snap ring 52. It will be understood that the snap ring 52 is circumferentially coincident with the extension 50 so that the entire periphery of the fastening extension 26 is gripped in place.

In assembling the mounting according to the present invention the web 20 and its surrounding rubber mass 22 are placed around the periphery of the glass and the channel 13 forced over them to form a seal at the interface between the glass and the interior of the initial channel 24 thus formed. It will be apparent that the web 20 has thus been deformed into the channel and that the extension 26 protrudes from the inside of the subassembly comprising the deformable strips 20 and channel 13. By pulling in on the fastening extension 26 the operator can seat the window in place in its opening, having previously inserted the rubber mass 14 which is a molded ring approximately coincident in circumference with the periphery of the window opening. It will be appreciated that the rubber ring 14 can stretch or can be slightly compressed to accommodate itself to variations in the size of the opening and the disposition of the glass in that opening at the next assembly step. By pulling inward on the fastening extensions 26 the operator can seat the glass in the opening and can exert the precise amount of tension necessary properly to seal the space between the body and the rubber ring 14 by deforming the fingers 40. Thus the mounting is established without setting up sufficient strain in the glass 10 to break it. The mounting is completed by fixing the fastening extension 26 to the interior of the body in any suitable manner as by the snap ring 52. Since the fastening extension 26 is substantially incapable of stretching in the direction of the arrows 21 the glass is held firmly against displacement outwardly of the body.

It will be appreciated that while the invention has been shown in connection with a specific form and disposition of the parts various modifications and changes may be made without departing from the spirit of the appended claims.

What I claim is:

1. Mounting means for a window light comprising a resilient gasket disposed in sealing relation to a window opening, a primary sealing strip in direct contact with the edges of a window light, a clamping strip overlying at least a portion of said primary sealing strip and adapted to grip the latter into tight sealing engagement with a window light, and a mounting extension on said primary sealing strip by which the window light is drawn inwardly into engagement with said resilient gasket.

2. Mounting means for a window light comprising a resilient gasket disposed in sealing relation to a window opening closed by said light, a primary sealing strip in direct contact with the edges of said light, a clamping strip overlying a portion of said primary sealing strip and gripping the latter into tight sealing engagement with said light, an inwardly directed mounting extension formed integrally with said primary sealing strip and by which the window light is drawn inwardly into engagement with said resilient gasket, said mounting extension being dimensionally stable in the direction in which tension is applied thereto when the light is drawn inwardly into said opening, and means to fasten said extension to a fixed portion defining said window opening.

3. Mounting means for a window light comprising a resilient gasket disposed in sealing relation to the bottom and inner surfaces of a window opening closed by said light, said gasket having one compression area formed as a series of flexible fingers engaging the surface of said window opening, a primary sealing strip in direct contact with the edges of said light, a clamping strip overlying a portion of said primary sealing strip and gripping the latter into tight sealing engagement with said light, an inwardly directed mounting extension formed integrally with said sealing strip and by which the window light is drawn inwardly into engagement with said resilient gasket, and means to fasten said extension to a fixed portion defining said window opening and, by exerting tension on said extension, compress the flexible fingers of said gasket into sealing relation with the surface of said window opening.

4. Mounting means for a glass light comprising a resilient gasket disposed in sealing relation to a window opening closed by said light, a primary sealing strip in direct contact with the edges of said light, a clamping channel member overlying a portion of said primary sealing strip and having its base opposite the periphery of said light and its sides defined by upstanding spring fingers gripping said primary sealing strip into tight sealing engagement with said light, an inwardly directed mounting extension formed integrally with said primary sealing strip and by which the light is drawn inwardly into engagement with said resilient gasket, said mounting extension being dimensionally stable in the direction in which said light is drawn into said opening, and means to fasten said extension to a fixed portion defining said window opening.

5. Mounting means for a window light comprising a resilient gasket disposed in sealing relation to a window opening closed by said light, a primary sealing strip in direct contact with the edges of said light, said strip comprising a metal web of serpentine formation capable of being bent in two directions but dimensionally stable in its width, said web being embedded in a resilient sealing mass, a clamping strip overlying a portion of said primary sealing strip and gripping the latter into tight sealing engagement with said light, and means to fasten said primary sealing strip to a fixed portion defining said window opening by engagement with that portion of said web which is not engaged by said clamping strip.

6. Mounting means for a window light comprising a resilient gasket disposed in sealing relation to a window opening closed by said light, a primary sealing strip of resilient material including a channel fitting directly over the periphery of the light and an inwardly directed mounting extension formed integral therewith and by which the window light is drawn inwardly into engagement with said resilient gasket, and a clamping channel member having its base opposite the edge of said light and its sides defined by a series of upstanding spring fingers at each side of the channel separated by slots arranged in staggered relation to each other laterally of the channel and gripping said primary sealing strip into tight sealing engagement with said light.

7. Mounting means for a window light comprising a resilient gasket disposed in sealing relation to a window opening closed by said light, a primary sealing strip of resilient material including a channel fitting directly over the periphery of the light and an inwardly directed mounting extension formed integral therewith and by which the window light is drawn inwardly into engagement with said resilient gasket, a metal reinforcing web embedded in the primary sealing strip and of serpentine formation to provide for flexibility thereof in two directions while rendering said mounting extension dimensionally stable in the direction in which the light is drawn into said opening, and a clamping channel member overlying a portion of said primary sealing strip and gripping the latter into tight sealing engagement with said light.

8. Mounting means for a window light comprising a resilient gasket disposed in sealing relation to a window opening closed by said light, a primary sealing strip of resilient material including a channel fitting over the periphery of the light and an inwardly directed mounting extension formed integral therewith and by which the window light is drawn inwardly into engagement with said resilient gasket, a metal reinforcing web embedded in the primary sealing strip having slots extending into the web from opposite edges thereof in staggered relation to each other laterally of said strip to provide flexibility in two directions while rendering said mounting extension dimensionally stable in the direction in which the light is drawn into said opening, and a clamping channel member overlying a portion of said primary sealing strip and gripping the latter into tight sealing engagement with said light.

9. Mounting means for a window light comprising a resilient gasket disposed in sealing relation to a window opening closed by said light, a primary sealing strip of resilient material including a channel fitting over the periphery of the light and an inwardly directed mounting extension formed integral therewith and by which the window light is drawn inwardly into engagement with said resilient gasket, a metal reinforcing web embedded in the primary sealing strip having slots extending into the web from opposite edges thereof in staggered relation to each other laterally of said strip to provide flexibility in two directions while rendering said mounting extension dimensionally stable in the direction in which the light is drawn into said opening, and a clamping channel member having its base opposite the edge of said light and its sides defined by a series of upstanding spring fingers at each side of the channel separated by slots arranged in staggered relation to each other laterally of the channel and gripping said primary sealing strip into tight sealing engagement with said light.

10. Mounting means for a window light, comprising a resilient gasket disposed in sealing relation to a window opening closed by said light, a primary sealing strip of resilient material including a channel fitting over the periphery of the light and an inwardly directed mounting extension formed integral therewith and by which the window light is drawn inwardly into engagement with said resilient gasket, a metal reinforcing web embedded in the primary sealing strip having spaced transverse slots with the adjacent slots extending inwardly from opposite edges of the web to provide spaced strips and being closed at their inner ends by transverse webs connecting said strip to provide a web of serpentine formation flexible in two directions while rendering said mounting extension dimensionally stable in the direction in which the light is drawn into said opening, and a clamping channel member having its base opposite the edge of said light and its sides defined by a series of upstanding spring fingers at each side of the channel separated by slots arranged in staggered relation to each other laterally of the channel and clamping said primary sealing strip into tight sealing engagement with said light.

JOHN P. PEARSE.

REFERENCES CITED

The following references are of record in the file of this patent:

UNITED STATES PATENTS

| Number | Name | Date |
|---|---|---|
| 2,070,676 | Northup | Feb. 16, 1937 |
| 2,160,068 | Graebner et al. | May 30, 1939 |
| 2,171,191 | Potter | Aug. 29, 1939 |
| 2,261,038 | Sherts | Oct. 28, 1941 |
| 2,273,182 | Dodge | Feb. 17, 1942 |
| 2,294,101 | Tripp | Aug. 25, 1942 |
| 2,313,419 | Bush | Mar. 9, 1943 |
| 2,399,204 | Cameron | Apr. 30, 1946 |
| 2,446,516 | Bailey | Aug. 10, 1948 |
| 2,479,436 | Vigmostad | Aug. 16, 1949 |